United States Patent
Takizawa

(10) Patent No.: US 9,369,630 B2
(45) Date of Patent: Jun. 14, 2016

(54) ELECTRONIC APPARATUS AND METHOD OF CONTROLLING THE SAME

(71) Applicant: SAMSUNG ELECTRONICS CO., LTD., Suwon-si, Gyeonggi-do (KR)

(72) Inventor: Junichi Takizawa, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 14/447,838

(22) Filed: Jul. 31, 2014

(65) Prior Publication Data

US 2015/0036009 A1 Feb. 5, 2015

(30) Foreign Application Priority Data

Jul. 31, 2013 (JP) .................................. 2013-159730
Feb. 19, 2014 (KR) ........................ 10-2014-0019214

(51) Int. Cl.
*H04N 5/232* (2006.01)
*H04N 5/361* (2011.01)

(52) U.S. Cl.
CPC ........... *H04N 5/23274* (2013.01); *H04N 5/361* (2013.01)

(58) Field of Classification Search
CPC H04N 5/23274; H04N 5/361; H04N 5/23277
See application file for complete search history.

(56) References Cited

U.S. PATENT DOCUMENTS

| 6,630,950 B1* | 10/2003 | Ohkawara | H04N 5/23248 348/208.11 |
| 2011/0310302 A1* | 12/2011 | Takeuchi | H04N 5/2625 348/584 |
| 2015/0326785 A1* | 11/2015 | Tsubaki | H04N 5/23248 348/208.2 |

FOREIGN PATENT DOCUMENTS

| JP | 06-133185 A | 5/1994 |
| JP | 2010-171769 A | 8/2010 |
| JP | 2012-004908 A | 1/2012 |
| JP | 2012-090041 A | 5/2012 |

* cited by examiner

*Primary Examiner* — Tuan Ho
(74) *Attorney, Agent, or Firm* — Drinker Biddle & Reath LLP

(57) ABSTRACT

An electronic apparatus that reduces fixed pattern noise by performing dark current subtraction is described. The electronic apparatus includes: an image sensor; a photographing control unit that photographs a plurality of images; a vibration reduction control unit that performs control to shift a coordinate position of a photographing region in which a subject image is formed by a predetermined pixel count within a photographable region of the image sensor whenever each of a plurality of images is photographed; a coordinate transformation unit that performs coordinate transformation such that a coordinate position of a plurality of photographed images matches a coordinate position of any photographed image; and an image combining unit that combines a plurality of coordinate-transformed photographed images.

11 Claims, 7 Drawing Sheets

ELECTRONIC APPARATUS AND METHOD OF CONTROLLING THE SAME

CROSS-REFERENCE TO RELATED PATENT APPLICATIONS

This application claims the priority benefit of Japanese Patent Application No. 2013-159730, filed on Jul. 31, 2013, in the Japanese Patent Office and Korean Patent Application No. 10-2014-0019214, filed on Feb. 19, 2014, in the Korean Intellectual Property Office, the disclosures of which are incorporated by reference herein in their entireties.

BACKGROUND

1. Field

Various embodiments of the present disclosure relate to electronic apparatuses and methods of controlling the same.

2. Related Art

A photographing apparatus, such as a digital camera or a video camera, obtains photographed image data of a subject by forming a subject image on an image sensor. The image sensor may receive incident light through an optical system including a photographing lens and a hand trembling compensating unit.

The hand trembling compensating unit is provided in the photographing apparatus to prevent image shaking caused by hand trembling. For example, when a pose or orientation change of the digital camera is detected by a sensor such as a gyro sensor, a position of a dedicated compensation optical system or the image sensor is slightly shifted to offset image shaking caused by hand trembling.

Also, in the image sensor, a noise signal referred to as a dark current is generated due to temperature even in a darkened state (e.g., when receiving low levels of incident light). Thus, since a fixed pattern noise caused by the dark current is superimposed on photographed image data read from an effective pixel region of the image sensor, a black level of an image increases.

In this case, a color reproduction level of the subject image in the photographed image data decreases. Thus, the fixed pattern noise is suppressed by subtracting the photographed image data (dark current) of the image sensor in a shaded state (dark state) from the photographed image data captured for an image.

In some dark current subtracting methods, when photographed image data obtained by photographing a subject image and photographed image data photographed in a dark state are analog-to-digital (A/D) converted, an error in the energy of both dark current components occurs in a quantization process. Thus, since a fixed pattern noise may not be sufficiently removed from the photographed image data even by dark current subtraction, fixed pattern noise may remain in the photographed image data obtained by photographing the subject image.

For example, when dark current subtraction processing is performed, a result as presented in Equation 1 below may occur, wherein I denotes a signal intensity of a photographed image, σd denotes a deviation from a dark current, and σd' denotes a deviation after dark current subtraction processing.

$$(\sigma d')2 = \sigma d2 + \sigma d2$$

$$\sigma d' = 2^{1/2} \sigma d$$

$$S/N' = I/(2^{1/2}\sigma d) \quad \text{[Equation 1]}$$

That is, when dark current subtracting processing is performed according to Equation 1, the energy of the fixed pattern noise of the photographed image decreases, but the deviation increases.

SUMMARY

Various embodiments of the present disclosure include electronic apparatuses and photographing methods that may more effectively reduce fixed pattern noise in a photographed image by performing dark current subtraction, in comparison to a related art method of reducing fixed pattern noise in a photographed image.

Additional embodiments will be set forth in part in the description which follows and, in part, will be apparent from the description, or may be learned by practice of the presented embodiments.

According to one or more embodiments, an electronic apparatus includes: an image sensor; a photographing control unit that photographs a plurality of photographed images; a vibration reduction control unit that performs control to shift a coordinate position of a photographing region, within a photographable region of the image sensor and in which a subject image is formed, by a predetermined pixel count when each of the plurality of photographed images is photographed; a coordinate transform unit that performs coordinate transformation on the plurality of photographed images such that a coordinate position of each of the plurality of photographed images matches a coordinate position of other photographed images of the plurality of photographed images; and an image combining unit that combines the plurality of coordinate-transformed photographed images into a combined photograph image.

The electronic apparatus may further include a dark current subtracting unit that performs dark current subtraction processing on each of the plurality of photographed images.

The dark current subtraction processing may acquire photographed image data in a dark state of the image sensor and subtract the photographed image data acquired in the dark state from data of each of the plurality of photographed images.

The vibration reduction control unit may shift a position of the photographing region, in which the subject image is formed, on an image surface of the image sensor by moving a vibration reduction lens that is disposed between a photographing lens and the image sensor.

The vibration reduction control unit may shift a position of the photographing region, in which the subject image is formed, on an image surface of the image sensor by moving the image sensor.

According to one or more embodiments, a method of reducing fixed pattern noise of a photographed image includes: photographing a plurality of photographed images; shifting a coordinate position of a photographing region, within a photographable region of an image sensor and in which a subject image is formed, by a predetermined pixel count when each of the plurality of photographed images is photographed; performing coordinate transformation on the plurality of photographed images such that a coordinate position of each of the plurality of photographed images matches a coordinate position of other photographed images of the plurality of photographed images; and combining the plurality of coordinate-transformed photographed images into a combined photograph image.

The method may further include performing dark current subtraction processing on each of the plurality of photographed images.

The performing of the dark current subtraction processing may include: acquiring photographed image data in a dark state of the image sensor; and subtracting the photographed image data acquired in the dark state from data of each of the plurality of photographed images.

The shifting of the coordinate position of the photographing range may include shifting a position of the photographing region, in which the subject image is formed, on an image surface of the image sensor by moving a vibration reduction lens that is disposed between a photographing lens and the image sensor.

The shifting of the coordinate position of the photographing range may include shifting a position of the photographing region, in which the subject image is formed, on an image surface of the image sensor by moving the image sensor.

According to one or more embodiments, a non-transitory computer-readable recording medium stores a program that, when executed by a computer, performs a method including: photographing a plurality of photographed images; shifting a coordinate position of a photographing region, within a photographable region of an image sensor and in which a subject image is formed, by a predetermined pixel count when each of the plurality of photographed images is photographed; performing coordinate transformation on the plurality of photographed images such that a coordinate position of each of the plurality of photographed images matches a coordinate position of other photographed images of the plurality of photographed images; and combining the plurality of coordinate-transformed photographed images into a combined photograph image.

BRIEF DESCRIPTION OF THE DRAWINGS

These and/or other embodiments will become apparent and more readily appreciated from the following description of various embodiments, taken in conjunction with the accompanying drawings in which.

DETAILED DESCRIPTION

Figure 1:
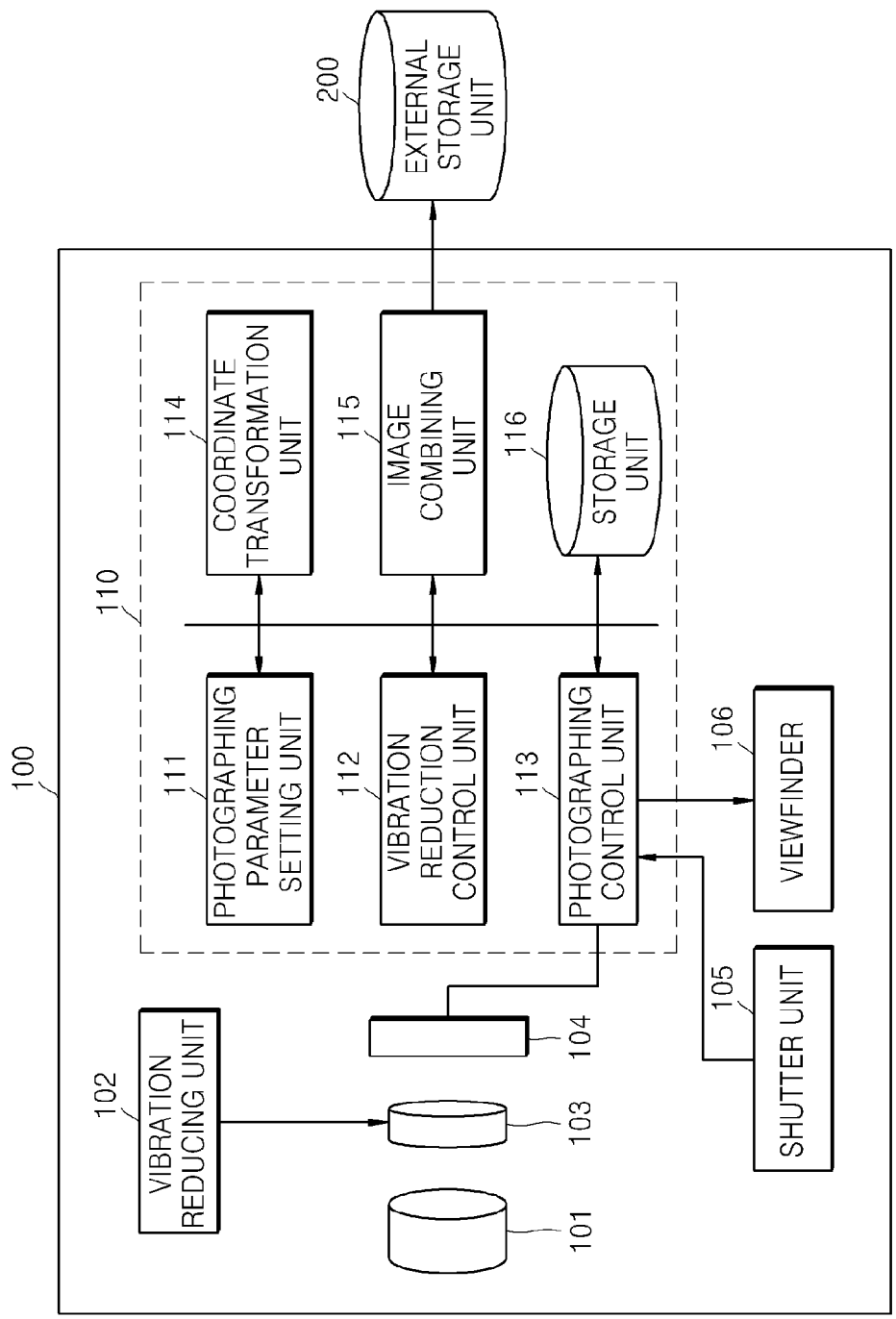
FIG. 1 is a schematic block diagram of an electronic apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain features of the present description.

In this specification, an embodiment or embodiments refer to particular characteristics, structures, and features that are described together with embodiments included in at least one embodiment. Therefore, the terms "embodiment" or "embodiments" appearing throughout the specification do not necessarily denote the same embodiments.

Hereinafter, various embodiments will be described with reference to the accompanying drawings. FIG. 1 is a schematic block diagram of an electronic apparatus 100 according to a first embodiment.

Referring to FIG. 1, the electronic apparatus 100 according to an embodiment may include a photographing lens 101, a vibration reducing unit 102, a vibration reduction lens 103, an image sensor 104, a shutter unit 105, a viewfinder 106, and a photographing processing unit 110. The photographing processing unit 110 may include a photographing parameter setting unit 111, a vibration reduction control unit 112, a photographing control unit 113, a coordinate transform unit 114, an image combining unit 115, and a storage unit 116.

In some embodiments, fixed pattern noise may be suppressed as random noise by using the vibration reducing unit 102 that is provided in the electronic apparatus 100 (e.g., a photographing apparatus or a digital camera) to prevent vibration of a photographed image due to hand trembling. Also, composite processing may be used to combine a plurality of pictures (e.g., photographed images) to generate a final photographed image. Herein, each of the plurality of photographed images to be combined is photographed while a photographing position on the image sensor 104, at which a subject image is formed, is shifted by a predetermined pixel count within a photographable region of the image sensor 104 (e.g., a region capable of capturing a photographed image). Fixed pattern noise may be suppressed as random noise by transforming the coordinates of pixels of each of the photographed images photographed with various shifted photographing positions and superimposing the photographed images because each position related to the fixed pattern noise in each photographed image is shifted by a different amount.

Also, in some embodiments, a mode conversion between prevention of hand trembling and fixed pattern noise suppression may be controlled by the electronic apparatus 100 based on user input.

The photographing lens 101 forms a subject image on an image surface (e.g., a two-dimensional coordinate system: image plane) of the image sensor 104.

The vibration reducing unit 102 drives the vibration reduction lens 103 on a two-dimensional plane that is parallel to the image surface in order to shift formation of the subject image to a predetermined position on the image surface of the image sensor 104.

The photographing parameter setting unit 111 sets parameters used to photograph a subject (e.g., exposure setting and setting of an F value of the photographing lens 101) based on user input or the like.

The image sensor 104 includes a charge coupled device (CCD) or complementary metal oxide semiconductor (CMOS) image sensor and outputs the subject image, which is formed on the image surface, as a photographed image to the photographing control unit 113. On the image surface of the image sensor 104, since an image formation position of the subject is shifted by the vibration reducing unit 102, a region larger than the size of an actual photographed image is provided as a photographable region that generates a photographed image. The image sensor 104 outputs photographed data of the entire photographable region, including the photographed image, to the photographing control unit 113.

When a user presses a shutter button (not shown), the shutter unit 105 transmits a shutter signal to the photographing control unit 113.

The viewfinder 106 displays the subject image formed on the image surface of the image sensor 104.

When receiving the shutter signal from the shutter unit 105, the photographing control unit 113 sequentially reads a plurality of photographed data from the image sensor 104. Also, the photographing control unit 113 outputs a vibration reduction control signal to the vibration reduction control unit 112 at the time of reading each of the plurality of photographed data.

When receiving the vibration reduction control signal from the photographing control unit 113, the vibration reduction control unit 112 outputs a driving signal to the vibration reducing unit 102 in order to shift a position of the photographed image on the image surface of the image sensor 104 by a predetermined pixel value (e.g., by a number of pixels).

Figure 2:
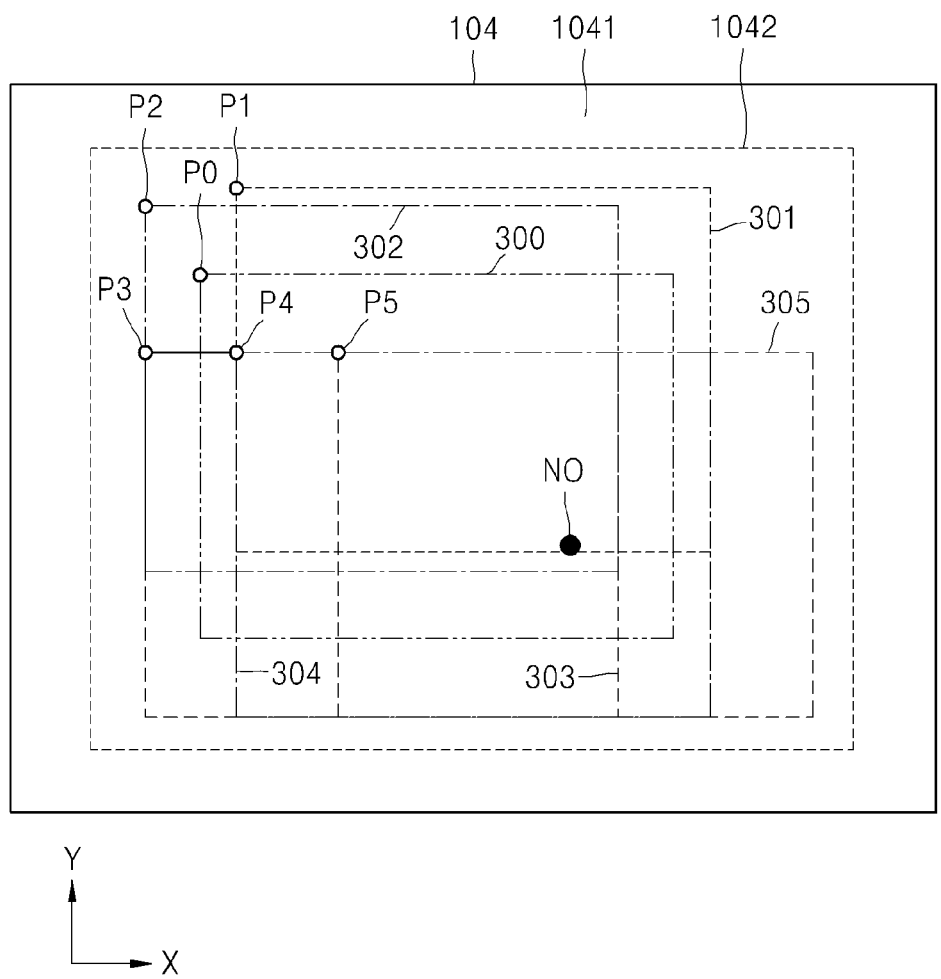
FIG. 2 illustrates positions of photographed images on an image surface of an image sensor, the photographed images being moved by a vibration reduction control unit.

FIG. 2 illustrates positions of photographed images on the image surface of the image sensor 104, which are moved by the vibration reduction control unit 112. In FIG. 2, NO denotes a position of fixed pattern noise on the image sensor 104. Also, a photographable region 1042 acquiring photographed data is set in an image surface 1041 of the image sensor 104. For example, in FIG. 2, in order to perform one-time photographing processing, six-time photographing data reading is performed by the photographing control unit 113 (e.g., six sets of photographing data are acquired from the image sensor 104).

A first photographing region 300 represents a portion in the photographable region 1042 of a first photographed image in first-read photographed data. Likewise, second, third, fourth, fifth, and sixth photographing regions 301, 302, 303, 304, and 305, respectively represent portions in the photographable region 1042 of photographed images in second, third, fourth, fifth, and sixth-read photographed data. When composite processing is performed on a plurality of photographed images, the photographing control unit 113 divides an exposure time in a general photographing mode, sets a division result as an exposure time of each of the plurality of photographed images, and sequentially photographs a plurality of images. Thus, the sum of the exposure times of the plurality of images photographed for composite processing is equal to an exposure time for photographing one image in a general photographing mode.

A coordinate position Z1 of a reference point P1 is a position $(X0+\Delta X1, Y0+\Delta Y1)$ that is shifted by $\Delta X1$ in an x-axis direction and by $\Delta Y1$ in a y-axis direction with respect to a coordinate position $(Z0)(X0,Y0)$ of a reference point P0. Likewise, a coordinate position Z2 of a reference point P2 is a position $(X0+\Delta X2, Y0+\Delta Y2)$ that is shifted by $\Delta X2$ in the x-axis direction and by $\Delta Y2$ in the y-axis direction with respect to the coordinate position $(Z0)(X0,Y0)$ of the reference point P0. A coordinate position Z3 of a reference point P3 is a position $(X0+\Delta X3, Y0+\Delta Y3)$ that is shifted by $\Delta X3$ in the x-axis direction and by $\Delta Y3$ in the y-axis direction with respect to the coordinate position $(Z0)(X0,Y0)$ of the reference point P0. A coordinate position Z4 of a reference point P4 is a position $(X0+\Delta X4, Y0+\Delta Y4)$ that is shifted by $\Delta X4$ in the x-axis direction and by $\Delta Y4$ in the y-axis direction with respect to the coordinate position $(Z0)(X0,Y0)$ of the reference point P0. A coordinate position Z5 of a reference point P5 is a position $(X0+\Delta X5, Y0+\Delta Y5)$ that is shifted by $\Delta X5$ in the x-axis direction and by $\Delta Y5$ in the y-axis direction with respect to the coordinate position $(Z0)(X0,Y0)$ of the reference point P0.

Shifted pixel counts $\Delta X1, \Delta X2, \Delta X3, \Delta X4,$ and $\Delta X5$ and $\Delta Y1, \Delta Y2, \Delta Y3, \Delta Y4,$ and $\Delta Y5$ representing coordinate positions where a plurality of images are to be photographed may be preset in the storage unit 116. Thus, whenever receiving the vibration reduction control signal from the photographing control unit 113, the vibration reduction control unit 112 may sequentially read the shifted pixel counts preset in the storage unit 116 and move the vibration reduction lens 103 such that a photographing region of a photographed image photographed on the image surface 1041 of the image sensor 104 (a region where a subject image is formed) may be shifted by as much as the shifted pixel count.

Likewise, the second to sixth photographing regions 301 to 305 respectively represent portions of photographed images in second to sixth-read photographed data. Referring to FIG. 2, the first photographing region 300 is disposed at a center of the photographable region 1042. The reference points P0 to P5 for position adjustment described below are respectively set in the first to sixth photographing regions 300 to 305. The plurality of photographed image data are sequentially stored in the storage unit 116 by the photographing control unit 113.

Figure 3:
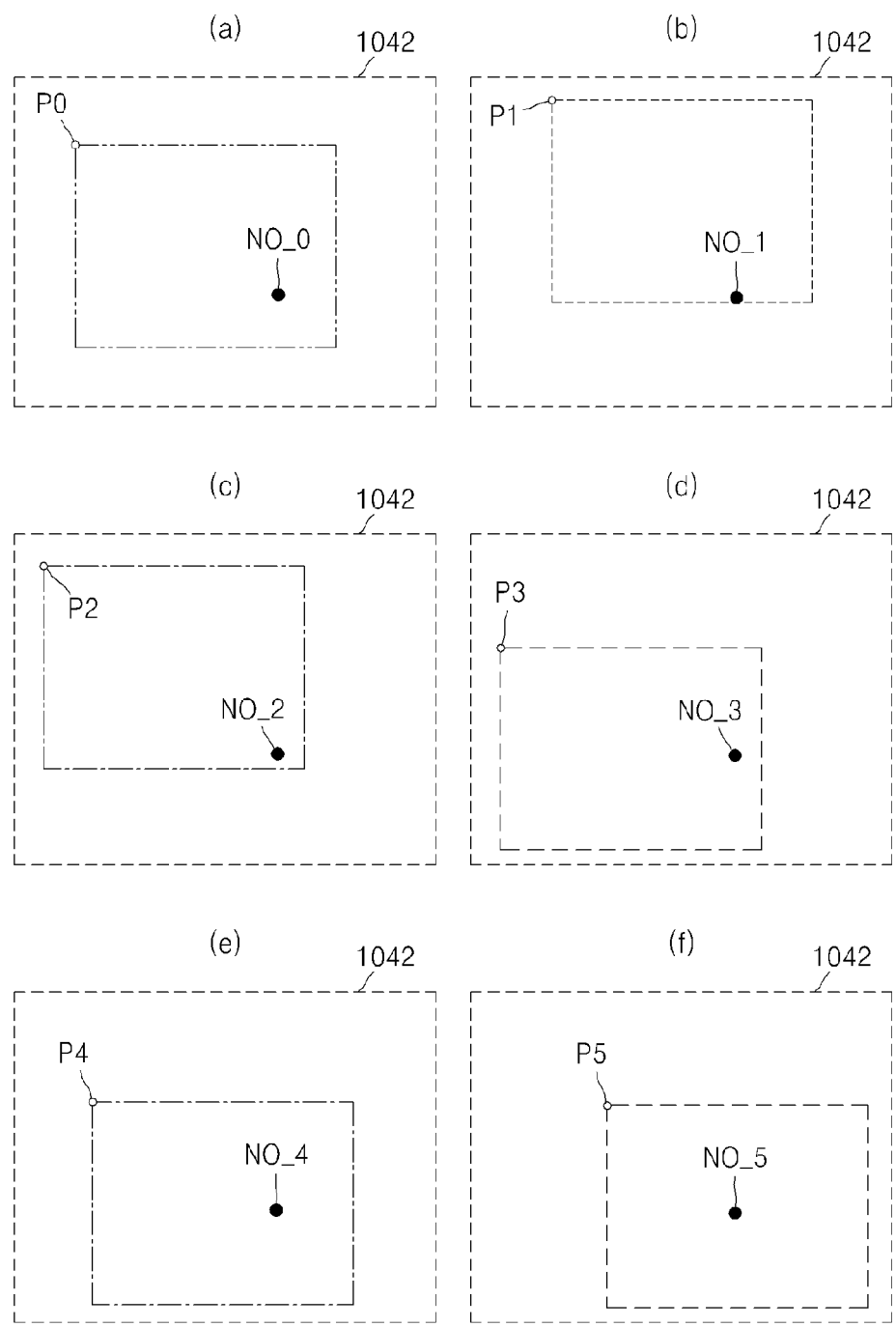
FIG. 3 illustrates examples of photographed images in photographed data stored in a storage unit.

FIG. 3 illustrates examples of photographed images in the photographed data stored in the storage unit 116.

FIG. 3A illustrates a photographed image of the first photographable region 300 in the photographed data of the photographable region 1042. FIG. 3B illustrates a photographed image of the second photographable region 301 in the photographed data of the photographable region 1042. FIG. 3C illustrates a photographed image of the third photographable region 302 in the photographed data of the photographable region 1042. FIG. 3D illustrates a photographed image of the fourth photographable region 303 in the photographed data of the photographable region 1042. FIG. 3E illustrates a photographed image of the fifth photographable region 304 in the photographed data of the photographable region 1042. FIG. 3F illustrates a photographed image of the sixth photographable region 305 in the photographed data of the photographable region 1042.

Referring to FIGS. 3A to 3F, positions of fixed pattern noises in a plurality of images photographed according to an embodiment are shifted. For example, a fixed pattern noise in the photographed image of FIG. 3A is denoted by NO_0, a fixed pattern noise in the photographed image of FIG. 3B is denoted by NO_1, a fixed pattern noise in the photographed image of FIG. 3C is denoted by NO_2, a fixed pattern noise in the photographed image of FIG. 3D is denoted by NO_3, a fixed pattern noise in the photographed image of FIG. 3E is denoted by NO_4, and a fixed pattern noise in the photographed image of FIG. 3F is denoted by NO_5.

Referring to FIG. 1, the coordinate transform unit 114 subtracts a shifted pixel count from a coordinate value of each of the pixels of the first to sixth photographing regions 300 to 305 stored in the storage unit 115 such that the coordinate position of each of the other reference points P1 to P5 matches the coordinate position of the reference point P0. For example, the coordinate transform unit 114 performs coordinate transformation such that the coordinate value of the pixel included in each of the other photographing regions 301 to 305 is equal to the coordinate value of each pixel included in the first photographing region 300. That is, the coordinate transform unit 114 may perform coordinate transformation such that the coordinate value of each of the reference points P1 to P5 of the other photographing regions 301 to 305 matches the reference point P0 of the first photographing region 300.

The image combining unit 115 combines the photographed images of the first to sixth photographing regions 300 to 305 such that all of the reference points P0 to P5 overlap each other. Herein, the image combining unit 115 superimposes image data (e.g., gray level) of each pixel corresponding to the same coordinate position in the first to sixth photographing regions 300 to 305. The image combining unit 115 stores the superimposed image data as image data of each pixel of the combined photographed image in an external storage unit 200.

Figure 4:
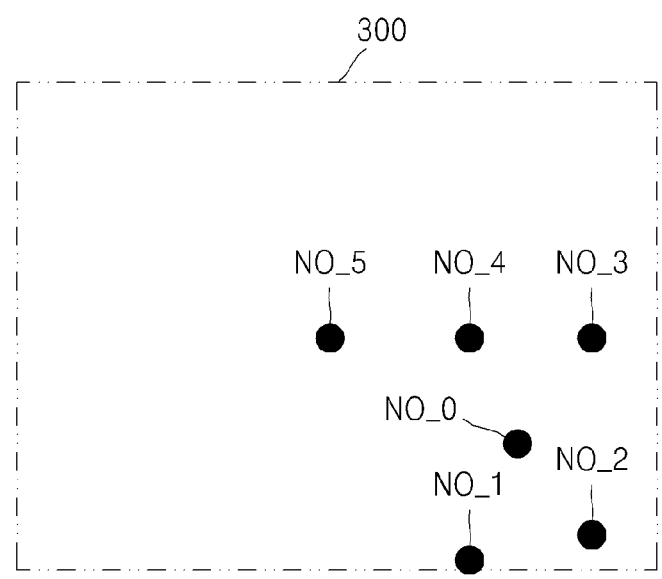
FIG. 4 illustrates a fixed pattern noise state when an image combining unit combines photographed images in first to sixth photographing regions.

FIG. 4 illustrates a fixed pattern noise state when the image combining unit 115 combines photographed images of the first to sixth photographing regions 300 to 305.

Referring to FIG. 4, in the combined photographed image, the fixed pattern noise is shifted by the shifted pixel count to a relatively shifted position with respect to a position in the photographed image of the first photographing region 300. Accordingly, when a plurality of photographed images are combined, the energy corresponding to the fixed pattern noise is reduced (e.g., spread over multiple pixels), and thus, the signal to noise ratio (S/N) ratio of the photographed image is improved.

That is, when N (e.g., 6) photographed images in FIG. 3 are superimposed and combined, the S/N' ratio of a combined photographed image of the N photographed images is calculated as random noise from the S/N ratio of one photographed image as expressed in Equation 2 below.

In Equation 2, I denotes a signal intensity of each photographed image (e.g., a gray level of each pixel), I' denotes a combined signal intensity of N photographed images, α denotes a noise intensity of each photographed image, and α' denotes a combined noise intensity of N photographed images.

$$I'=NI$$

$$(\alpha')2=N\alpha 2$$

$$S/N'=I'/\alpha'=N1/2 S/N \qquad \text{[Equation 2]}$$

Hereinafter, a photographing operation (including fixed pattern noise reduction) of the electronic apparatus 100 according to the present embodiment will be described with reference to FIG. 5.

Figure 5:
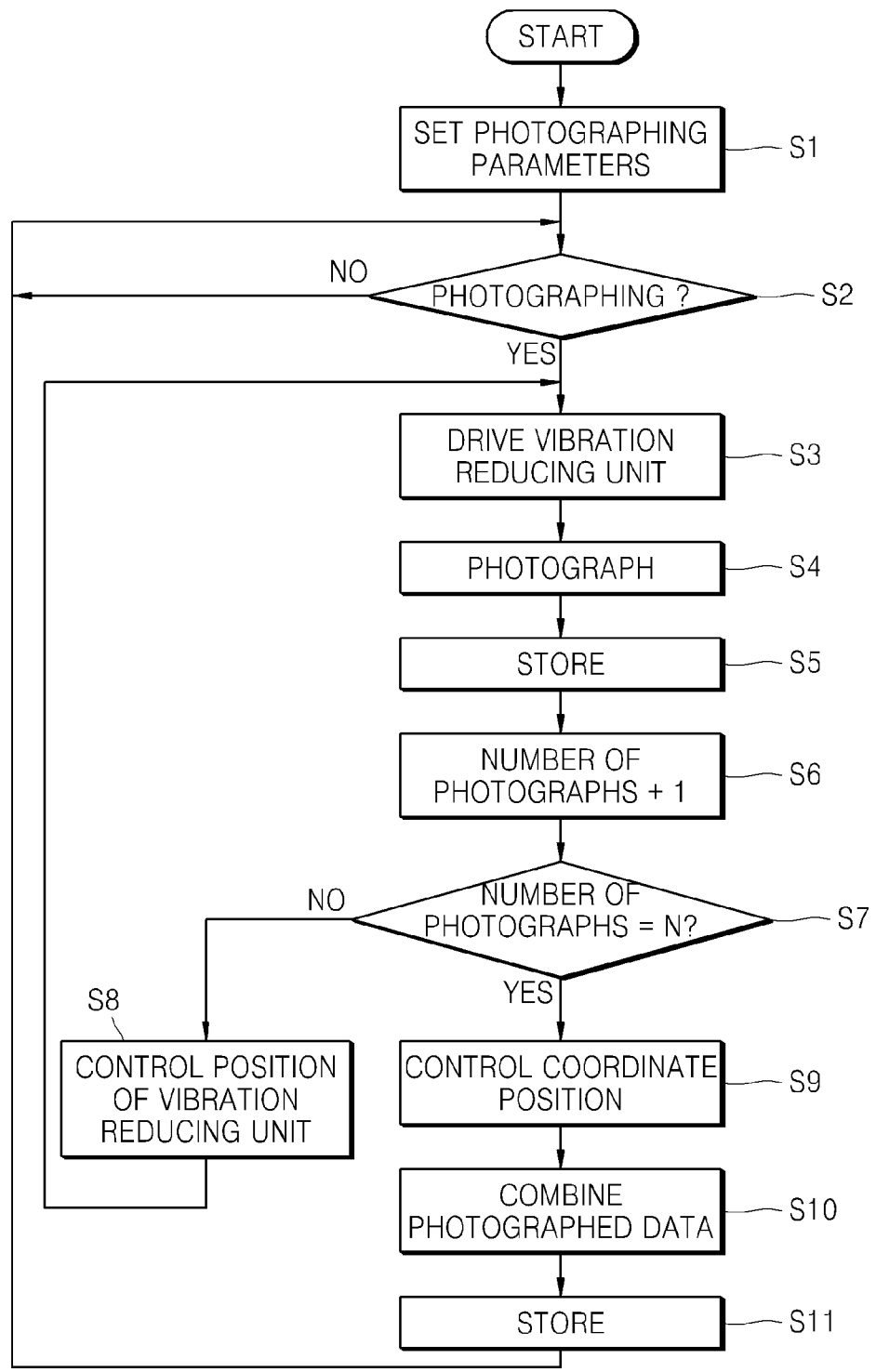
FIG. 5 is a flowchart of a method of reducing fixed pattern noise by the electronic apparatus of FIG. 1, according to an embodiment.

FIG. 5 is a flowchart of a method of reducing fixed pattern noise by the electronic apparatus 100 according to an embodiment.

Reduction of fixed pattern noise by combination of N (e.g., 6) photographed images will be described below.

Operation S1

When the electronic apparatus 100 is powered on, the photographing parameter setting unit 111 sets each photographing parameter for composite photographing of a plurality of pictures as a parameter that is input by the user through an input unit. For example, a shutter exposure time for obtaining necessary exposure is set to 1/N (number of photographs). Also, for setting of N groups of shifted pixel counts, the photographing parameter setting unit 111 sequentially writes and stores shifted pixel counts in the storage unit 116. For this parameter, the photographing control unit 113 and the vibration reduction control unit 112 read predetermined setting values from the storage unit 116 to control photographing.

Also, the photographing control unit 113 and the vibration reduction control unit 112 each reset an internal counter to 0. Herein, the count value corresponds to the number of photographs.

Operation S2

The photographing control unit 113 displays a photographed image of a subject image, which is formed on the image surface 1041 of the image sensor 104, on the viewfinder 106.

The photographing control unit 113 periodically determines whether a shutter signal is received from the shutter unit 105. When a shutter signal is received (YES at S2), the photographing control unit 113 proceeds to operation S3; and when a shutter signal is not received (NO at S2), the photographing control unit 113 repeats operation S2.

Operation S3

When detecting the shutter signal (YES at S2), the photographing control unit 113 outputs a vibration reduction control signal to the vibration reduction control unit 112.

When receiving the vibration reduction control signal from the photographing control unit 113, the vibration reduction control unit 112 reads a shifted pixel count corresponding to the internal counter from the storage unit 116.

For example, when the count value is 0, the shifted pixel count is 0 because the photographed image is within the first photographing region 300 and does not need to be shifted. When the count value is 1, the shifted pixel count is ($\Delta Y1$, $\Delta X1$) because the photographed image is within the second photographing region 301. When the count value is 5, the shifted pixel count is ($\Delta Y5, \Delta X5$) because the photographed image is within the sixth photographing region 305.

Then, the vibration reduction control unit 112 controls the vibration reducing unit 102 to move the vibration reduction lens 103 in order to shift the formation position of the subject image by the shifted pixel count read from the storage unit 116 according to the count value, that is, in order to shift the photographing region within the photographable region 1042.

Also, when the vibration reducing unit 102 has moved the vibration reduction lens 103, the vibration reduction control unit 112 transmits an end signal to the photographing control unit 113.

Operation S4

When receiving the end signal, the photographing control unit 113 reads photographed data from the image sensor 104, performs photographing processing of photographed data to be used for combination, and proceeds to operation S5.

Operation S5

The photographing control unit 113 adds photographed data identification information, for example, a photographing order indication number, to the photographed data read from the image sensor 104.

Then, the photographing control unit 113 writes and stores the photographed data to which the identification information was added in the storage unit 116, transmits a photographing end signal to the vibration reduction control unit 112, and proceeds to operation S6.

Operation S6

When receiving the photographing end signal, the vibration reduction control unit 112 increases the count value of the internal counter (by 1) and proceeds to operation S7.

Also, in this case, the photographing control unit 113 increases the count value of the internal counter. That is, the vibration reduction control unit 112 and the photographing control unit 113 increase the count corresponding to the number of photographs by 1.

Operation S7

The photographing control unit 113 determines whether the number of photographs is equal to N (=6). That is, the photographing control unit 113 determines whether the count value of the internal counter is equal to N-1 (=5).

When the number of photographs is equal to N (YES at S7), the photographing control unit 113 proceeds to operation S9; and when the number of photographs is smaller than N (NO at S7), the photographing control unit 113 proceeds to operation S8.

Operation S8:

After increasing the count corresponding to the number of photographs, the vibration reduction control unit 113 controls and returns the vibration reducing unit 102 to the reference position before movement and proceeds to operation S3.

Operation S9

The coordinate transform unit 114 transforms the coordinate position of the pixels of each of the second to sixth photographing regions 301 to 305 into the coordinate position of the pixel corresponding to the first photographing region 300.

That is, the coordinate transform unit 114 reads photographed data from the storage unit 116 in the order of photographing, subtracts the shifted pixel count of the formation position of the subject image from the coordinate position of all pixels in each of the second to sixth photographing regions 301 to 305 to perform coordinate transformation such that the coordinate position is equal to the coordinate (including the reference point P0) of the pixel of the first photographing region 300. For example, in the case of the second photographing region 301, the pixel count to be subtracted is $\Delta X1$ in the X-axis direction and $\Delta Y1$ in the Y-axis direction. Accordingly, the coordinate position Z1 (X0+$\Delta X1$,Y0+$\Delta Y1$) of the reference point P1 of the second photographing region 301 becomes the coordinate position Z1 (X0,Y0) and becomes equal to the coordinate position Z0(X0,Y0). Accordingly, since the coordinate position of each pixel in the second photographing region 301 is also relatively coordinate-transformed with respect to the reference point P1, the coordinate position of each pixel in the second photographing region 301 becomes a coordinate value equal to the coordinate position of each pixel in the first photographing region 300.

Operation S10

The image combining unit 115 combines the photographed images of the first to sixth photographing regions 300 to 305.

That is, the image combining unit 115 adds the image data of the pixel having the same coordinate position as the first photographing region 300 in each of the second to sixth photographing regions 301 to 305 to the image data of each pixel of the first photographing region 300.

Operation S11

The image combining unit 115 combines the photographed images of the first to sixth photographing regions 300 to 305 and stores the combined photographed image in the external storage unit 200.

Then, the image combining unit 115 returns to operation S2.

According to the present embodiment described above, since the fixed pattern noise may be processed as random noise, the fixed pattern noise may be sufficiently reduced and the S/N ratio of the photographed image may be improved in comparison with the related art.

Figure 6:
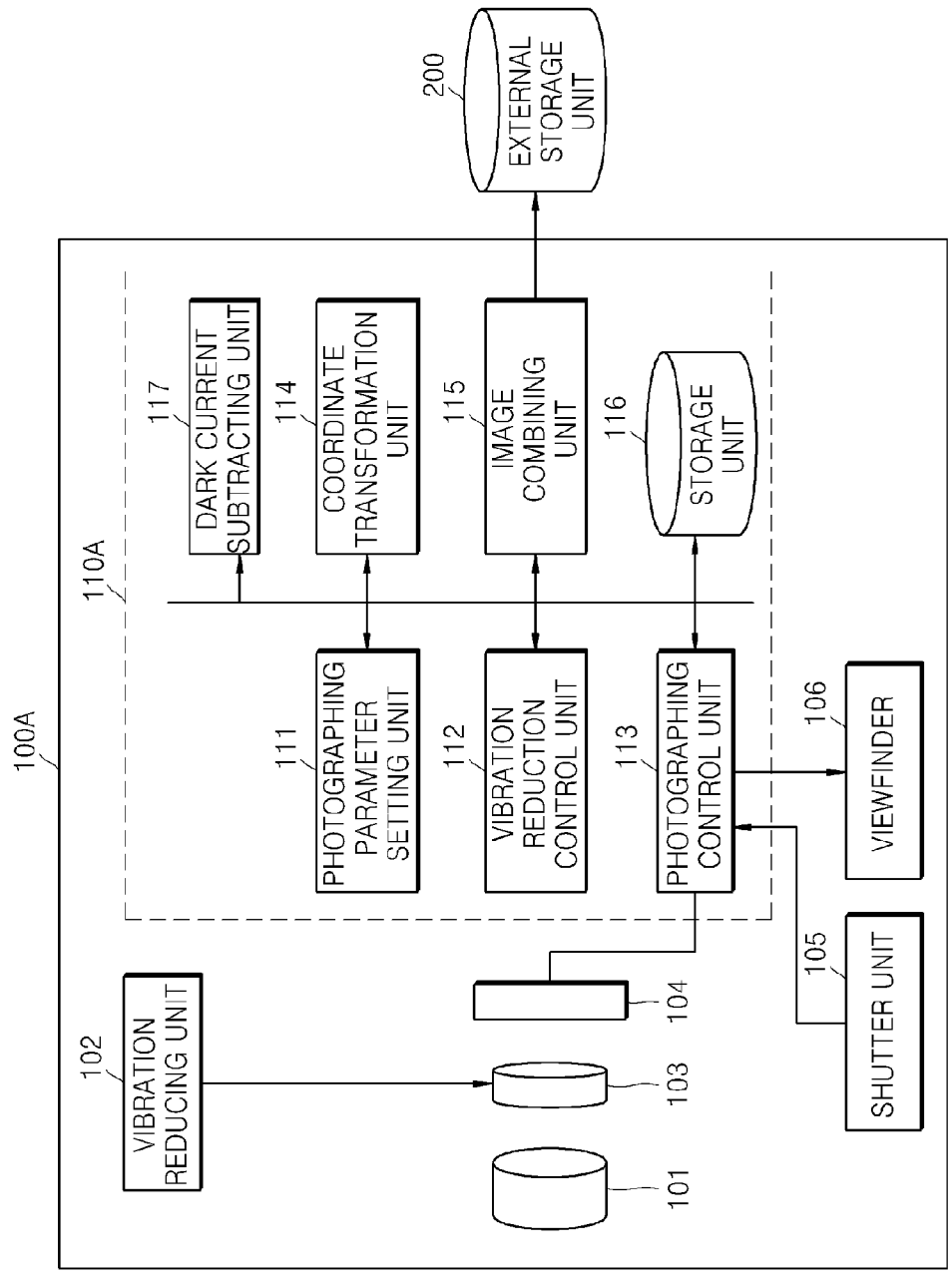
FIG. 6 is a schematic block diagram of an electronic apparatus according to another embodiment.

Hereinafter, a second embodiment will be described with reference to the accompanying drawings. FIG. 6 is a schematic block diagram of an electronic apparatus 100A according to the second embodiment.

In the electronic apparatus 100A of FIG. 6, elements that are the same with elements in the electronic apparatus 100 of FIG. 1 will be denoted by the same reference numerals and descriptions thereof will be omitted.

Referring to FIG. 6, the electronic apparatus 100A according to an embodiment may include a photographing lens 101, a vibration reducing unit 102, a vibration reduction lens 103, an image sensor 104, a shutter unit 105, a viewfinder 106, and a photographing processing unit 110A. The photographing processing unit 110A may include a photographing parameter setting unit 111, a vibration reduction control unit 112, a photographing control unit 113, a coordinate transform unit 114, an image combining unit 115, a storage unit 116, and a dark current subtracting unit 117. The second embodiment is generally different from the first embodiment in that the dark current subtracting unit 117 is further included, and this difference will be described below.

The dark current subtracting unit 117 performs dark current subtraction processing such that image data of each pixel of photographed data photographed when the image surface 1041 of the image sensor 104 is in a dark state is subtracted from image data of each pixel of photographed data photographed by forming a subject image on the image surface 1041 of the image sensor 104.

Accordingly, the dark current subtracting unit 117 may reduce the energy corresponding to fixed pattern noises NO_0 to NO_5 in the first to sixth photographing regions 300 to 305.

Also, as in the first embodiment, the image combining unit 115 may generate a combined photographed image having a reduced fixed pattern noise by combining photographed images of the first to sixth photographing regions 300 to 305 having reduced fixed pattern noises.

Figure 7:
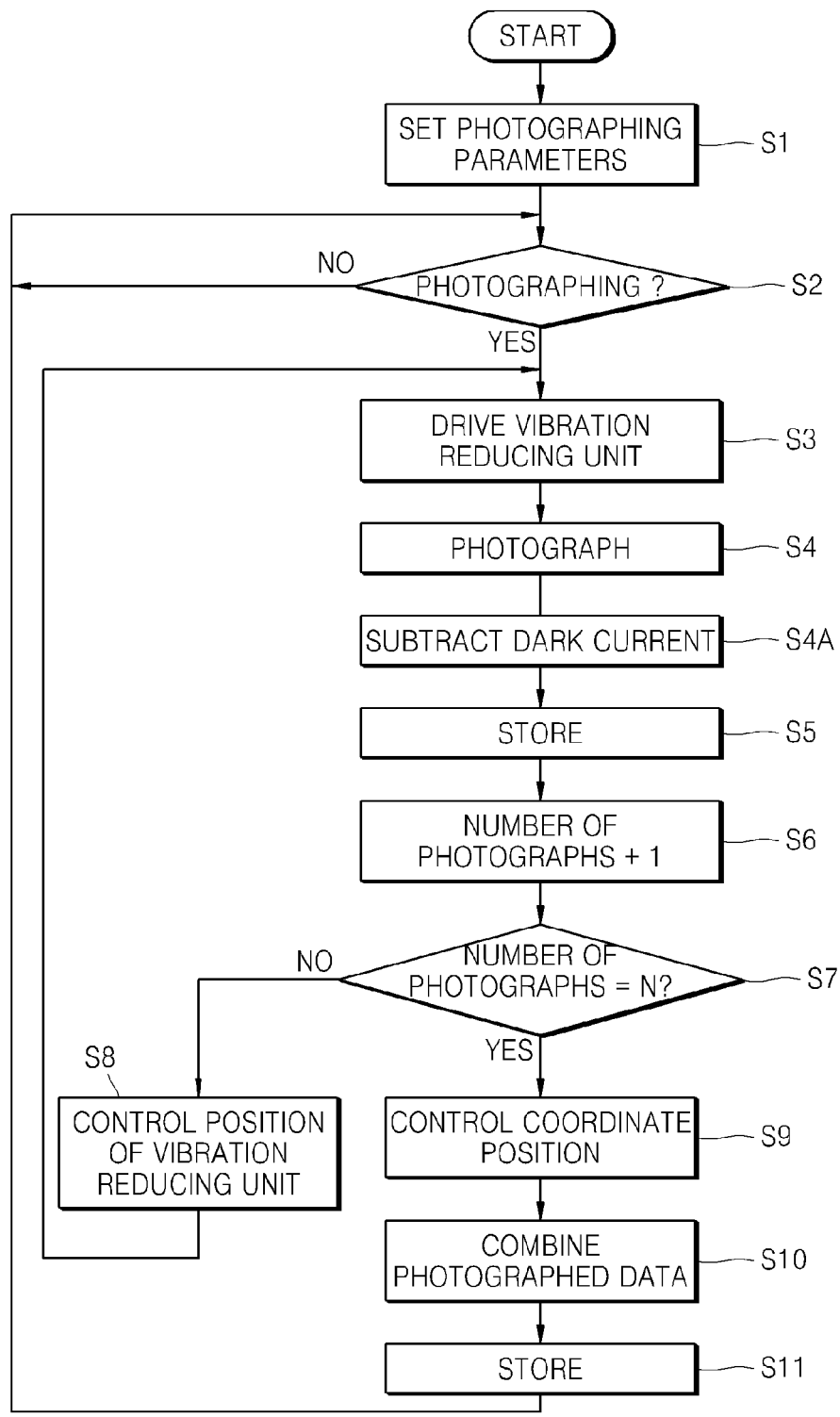
FIG. 7 is a flowchart of a method of reducing fixed pattern noise by the electronic apparatus of FIG. 6, according to an embodiment.

FIG. 7 is a flowchart of a method of reducing fixed pattern noise by the electronic apparatus 100A according to an embodiment.

In comparison with the flowchart of FIG. 5, in the flowchart of FIG. 7, operations S4A performed by the dark current subtracting unit 117 is added between operation S4 and operation S5.

The following processing is performed in operation S4A.

The photographing control unit 113 reads dark state photographed data from the image sensor 104 when the image sensor 104 is in a dark state.

Then, the dark current subtracting unit 117 performs dark current subtraction processing by subtracting image data of each pixel included in the dark state photographed data from image data of each pixel included in photographed data obtained by photographing a subject image. Then, the dark current subtracting unit 117 outputs the photographed data, obtained by the dark current subtraction, to the photographing control unit 113.

When receiving the photographed data obtained by the dark current subtraction, the photographing control unit 113 adds identification information to the photographed data as described above, stores the photographed data added with the identification information in the storage unit 116 in operation S5, transmits a photographing end signal to the vibration reduction control unit 112, and proceeds to operation S6. Since operations S6 to S11 are identical to those illustrated in FIG. 5, descriptions thereof will be omitted.

Thus, in the present embodiment, since dark current subtraction is performed and then fixed pattern noise is processed as random noise to reduce the fixed pattern noise, the energy corresponding to the fixed pattern noise may be further reduced in comparison with the first embodiment.

In the first embodiment and the second embodiment, the vibration reducing unit 102 moves the vibration reduction lens 103. However, the configuration used to shift the photographing regions 300 to 305 is not limited to the vibration reduction lens 103. For example, the vibration reducing unit 102 may move the image sensor 104 in the X-axis and Y-axis directions on the XY plane that is parallel to the image surface 1041 of the image sensor 104.

That is, the electronic apparatus 100 may be configured such that a photographing region (a region corresponding to a photographed image) of a photographed image where a subject image is formed may be shifted by horizontally moving the image sensor 104 by a shifted pixel count. Even in this case, processing operations for coordinate transformation of the photographing region and combination of the photographed images are the same as the processing operations described in the first embodiment and the second embodiment.

Also, a program for implementing the fixed pattern noise removing function of the electronic apparatus 100 of FIG. 1 or the electronic apparatus 100A of FIG. 6 may be written in a computer-readable recording medium and may be read and executed in a computer system to reduce the energy of the fixed pattern noise by processing the fixed pattern noise as random noise. Herein, the computer system includes hardware such as an operating system (OS) and peripheral devices.

When the computer system uses a word wide web (WWW) service, it also includes a homepage providing environment (or displaying environment).

The computer-readable recording medium refers to a portable medium such as a flexible disk, a magneto-optical disk, a read-only memory (ROM), or a CD-ROM, or a memory device such as a hard disk installed in the computer system. Also, the computer-readable recording medium also includes a dynamic storage of a program for a short period of time like a communication line in the case of transmitting the program through a communication circuit such as a telephone circuit or a network such as the Internet, and a storage of a program for a predetermined period of time like a volatile memory included in a computer system acting as a server or a client. Also, the program may implement a portion of the above-described function, or may implement the above-described function in combination with a program written in the computer system.

As described above, according to the one or more of the above embodiments, the electronic apparatuses and the methods of controlling the same may improve an S/N ratio in a combined photographed image by processing a fixed pattern noise as a random noise by combining photographed images. Accordingly, the fixed pattern noise may be further reduced in comparison to the related art.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the invention as defined by the following claims.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An electronic apparatus comprising:
   an image sensor;
   a photographing control unit that photographs a plurality of photographed images;
   a vibration reduction control unit that performs control to shift a coordinate position of a photographing region, within a photographable region of the image sensor and in which a subject image is formed, by a predetermined pixel count when each of the plurality of photographed images is photographed;
   a coordinate transform unit that performs coordinate transformation on the plurality of photographed images such that a coordinate position of each of the plurality of photographed images matches a coordinate position of other photographed images of the plurality of photographed images; and
   an image combining unit that combines the plurality of coordinate-transformed photographed images into a combined photograph image.

2. The electronic apparatus of claim 1, further comprising a dark current subtracting unit that performs dark current subtraction processing on each of the plurality of photographed images.

3. The electronic apparatus of claim 2, wherein the dark current subtraction processing acquires photographed image data in a dark state of the image sensor and subtracts the photographed image data acquired in the dark state from data of each of the plurality of photographed images.

4. The electronic apparatus of claim 1, wherein the vibration reduction control unit shifts a position of the photographing region, in which the subject image is formed, on an image surface of the image sensor by moving a vibration reduction lens that is disposed between a photographing lens and the image sensor.

5. The electronic apparatus of claim 1, wherein the vibration reduction control unit shifts a position of the photographing region, in which the subject image is formed, on an image surface of the image sensor by moving the image sensor.

6. A method of reducing fixed pattern noise of a photographed image, the method comprising:
   photographing a plurality of photographed images;
   shifting a coordinate position of a photographing region, within a photographable region of an image sensor and in which a subject image is formed, by a predetermined pixel count when each of the plurality of photographed images is photographed;
   performing coordinate transformation on the plurality of photographed images such that a coordinate position of each of the plurality of photographed images matches a coordinate position of other photographed images of the plurality of photographed images; and
   combining the plurality of coordinate-transformed photographed images into a combined photograph image.

7. The method of claim 6, further comprising performing dark current subtraction processing on each of the plurality of photographed images.

8. The method of claim 7, wherein the performing of the dark current subtraction processing comprises:
   acquiring photographed image data in a dark state of the image sensor; and
   subtracting the photographed image data acquired in the dark state from data of each of the plurality of photographed images.

9. The method of claim 6, wherein the shifting of the coordinate position of the photographing region comprises shifting a position of the photographing region, in which the subject image is formed, on an image surface of the image sensor by moving a vibration reduction lens that is disposed between a photographing lens and the image sensor.

10. The method of claim 6, wherein the shifting of the coordinate position of the photographing region comprises shifting a position of the photographing region, in which the subject image is formed, on an image surface of the image sensor by moving the image sensor.

11. A non-transitory computer-readable recording medium that stores a program that, when executed by a computer, performs the method of claim 6.

* * * * *